June 4, 1946.    A. G. GROSS    2,401,300
REFRIGERATION
Filed June 24, 1942    3 Sheets-Sheet 1

INVENTOR
*Alfred G. Gross*
BY
*Harry S. Dumaree*
ATTORNEY

INVENTOR
*Alfred G. Gross*
BY
*Harry S. Dumarse*
ATTORNEY

June 4, 1946.　　　　A. G. GROSS　　　　2,401,300
REFRIGERATION
Filed June 24, 1942　　　　3 Sheets-Sheet 3

INVENTOR
Alfred G. Gross
BY
Harry S. Dumars
ATTORNEY

Patented June 4, 1946

2,401,300

UNITED STATES PATENT OFFICE 2,401,300

REFRIGERATION

Alfred G. Gross, Wilmette, Ill., assignor to The Hoover Company, North Canton, Ohio, a corporation of Ohio Application June 24, 1942, Serial No. 448,247

24 Claims. (Cl. 62—119.5)

This invention relates to the art of refrigeration and particularly to absorption refrigerating apparatuses of the three-fluid type.

Heretofore it has been very difficult to provide absorption refrigerating apparatuses which will produce refrigeration over large areas of space and at widely separated points without using an auxiliary refrigerating system or some like device. This has arisen from the fact that the liquid refrigerant will evaporate substantially in toto into the inert gas in a relatively short path of flow.

It is accordingly a principal object of the invention to provide a three-fluid absorption refrigerating apparatus particularly characterized by its ability to produce a primary refrigerating effect in a localized zone or area and to render the refrigeration there produced effective at a distance from the zone of evaporation without utilizing auxiliary systems and the like.

It is a further object of the present invention to provide an absorption refrigerating apparatus in which a primary refrigerating effect is produced in a localized zone or area which there serves to meet a primary refrigerating need and also to meet a secondary refrigerating need at a remote point through the medium of a fluid circulating in the system which is caused to circulate by a force, condition, or effect present in the primary refrigerating zone.

It is a specific object of the invention to provide an absorption refrigerating system of the three-fluid type in which the inert gas circulating through a primary refrigerating zone there produces a primary refrigerating effect which serves a refrigerating need at the primary zone and also serves to refrigerate a fluid circulating through the system which fluid is circulated by the inert gas circulating through the primary refrigerating zone.

It is a further object of the present invention to provide an absorption refrigerating apparatus of the three-fluid type which is characterized by the provision of a cooling circuit in which a large body of liquid is normally maintained and incorporates a means which is effective to prevent accumulation of foreign material within the evaporating zone and its associated liquid circuit beyond a predetermined maximum amount.

Other objects and advantages of the invention will become apparent as the description proceeds when taken in connection with the accompanying drawings, in which—

Figures 1, 2:
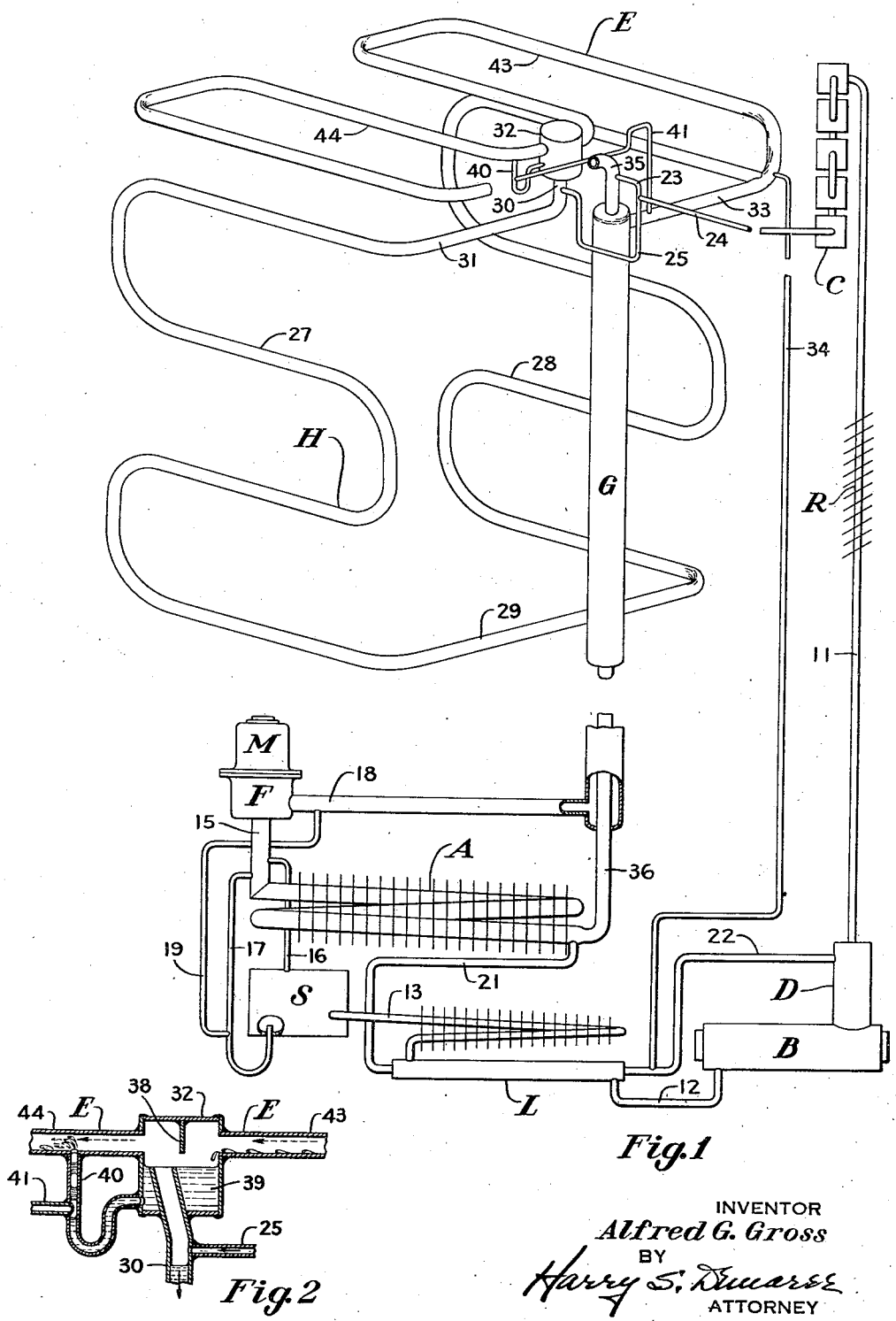
Figure 1 is a diagrammatic representation of a refrigerating system embodying the present invention.
Figure 2 is a detail sectional view on an enlarged scale of a portion of the apparatus illustrated in Figure 1.

Referring now to the drawings in detail and first to Figure 1 thereof, the apparatus comprises a boiler B, an analyzer D, an air-cooled rectifier R, a tubular air-cooled condenser C, an evaporating element E, a chilling coil H, a gas heat exchanger G, a tubular air-cooled absorber A, a liquid heat exchanger L, a solution reservoir S, a gas circulating pump F and an electrical motor M which drives the circulating element F. These elements are suitably interconnected by various conduits to produce a plurality of gas and liquid circuits which will be described in detail hereinafter.

The apparatus will be charged with a suitable refrigerant, such as ammonia, an absorbent therefor, such as water, and a pressure equalizing medium which is inert with respect to the refrigerant and absorbent, preferably a dense gas such as nitrogen.

The boiler B will be provided with a suitable electrical or fuel burning heater, not shown, of known type.

The heating element for the boiler B and the motor M may be controlled by any desired or preferred control mechanism such as that illustrated and described in U. S. Letters Patent 2,228,343, dated January 14, 1941.

The application of heat to the boiler B causes evolution of refrigerant vapor from the solution therein contained. The vapor so liberated passes upwardly through the analyzer from which it is conveyed to the upper portion of the condenser C by means of the conduit 11 which includes the rectifier R.

The weak solution formed in the boiler B by the evolution of refrigerant vapor is conveyed therefrom to the solution reservoir S by way of conduit 12, liquid heat exchanger L, and the looped finned pre-cooling conduit 13. The upper or gas containing space of the reservoir S is vented to the suction conduit 15 of the gas circulating element by the conduit 16. The solution collecting in the reservoir S is elevated therefrom into the lower end of the conduit 15 by means of a gas lift pump conduit 17 to which pumping gas is supplied from the gas discharge conduit 18 of the circulating element F by means of a conduit 19. The solution discharged into the conduit 15 drops downwardly therein into the upper end of the absorber A through which it flows substantially continuously downwardly by gravity. In the absorber A the lean solution is brought into contact with a mixture of the inert medium and refrigerant vapor which are supplied in a manner to be described hereinafter and flows through the absorber in counterflow relationship with the solution. In the absorber the solution absorbs refrigerant vapor from the gas vapor mixture stream and the resulting enriched solution flows to the bottom of the absorber from which point it is conveyed to the upper end of the analyzer D by means of the conduit 21, the liquid heat exchanger L and the conduit 22. The enriched solution then flows downwardly through the analyzer in contact with and in counterflow relationship with freshly generated refrigerant vapor and ultimately returns to the boiler, thus completing the solution circuit.

The refrigerant vapor which is supplied to the condenser C is liquefied therein by heat exchange with atmospheric air and the resulting liquid drains from the lower portion of the condenser C through conduit 24 and U-tube 25 into the upper portion of the cooling unit H. A vent conduit 23 connects conduit 24 to the rich gas conduit 35.

The cooling element H as illustrated comprises a pair of vertically extended sinuous sections 27 and 28 which are serially connected at their lower ends by a conduit section 29. The liquid refrigerant pipe 25 connects to the upwardly turned portion 30 of a conduit 31 connecting the section 27 of the cooling unit H to the lower end of a separation chamber 32 to be described hereinafter. The upper end of the right hand section 28 of the cooling unit H opens into an inert gas supply conduit 33 which connects directly to the evaporator E.

The chamber 32 is interposed at approximately the midpoint of the sinuous evaporator E as illustrated.

The lean inert gas formed in the absorber flows through pipe 15 into the circulating fan F wherein it is placed under pressure and flows to the evaporator E by way of conduit 18, the outer path of the gas heat exchanger G and the conduit 33. The inert gas traverses both portions of the evaporator E and the chamber 32 and returns to the absorber by way of the conduit 35, the inner path of the heat exchanger G and the conduit 36 which connects to the bottom portion of the absorber. The rich inert gas then flows upwardly through the absorber in contact with and in counterflow relationship with the absorbing solution as described heretofore, thus completing the inert gas circuit.

The cooling unit coil H is flooded; that is, it is completely filled with liquid refrigerant to a level determined by the point of connection of the conduit 34 to the conduit 33. The conduit 34 is simply an overflow conduit and determines the level in conduit 33 and consequently the liquid level in the section 28 of the cooling unit H. Overflow liquid traverses conduit 34 and flows into the rich solution conduit 22.

The conduit 33 and evaporator conduit E are of such diameter that the inert gas under pressure flowing therethrough will circulate the liquid refrigerant by the frictional dragging action. The inert gas supplied through conduit 33 serves to elevate liquid refrigerant from conduit 28 into the part 43 of evaporator E through which it flows, while partially evaporating, to the gas and liquid separation chamber 32 shown in detail in Figure 2.

In the enlarged chamber 32 the liquid refrigerant is separated from the gas by a baffle 38 and collects in a pool 39 in the bottom of the chamber. The major portion of the liquid in the pool 39 together with liquid supplied from the condenser through conduit 25 flows downwardly through conduit 30 into the section 27 of evaporator H. A fixed proportion of the liquid, however, is conveyed by the gas lift pump conduit 40 into the left hand side 44 of the evaporator E for further evaporation. Pumping gas is supplied to the conduit 40 by a conduit 41 connected to the conduit 33. The liquid supplied through the conduit 40 then traverses the left hand end of the evaporator E and unevaporated residue discharges through the conduit 35, gas heat exchanger G and conduit 36 where it mingles with the rich solution in the conduit 21.

The apparatus is so designed that the quantity of liquid refrigerant circulating through the right hand side 43 of the evaporator E will be many times greater than the amount circulating through the left hand side 44 of the evaporator E. This is due to the fact that the gas circulating through the section 43 is circulating a large quantity of liquid supplied from the conduit 28, only a small portion of which will evaporate in conduit 43, the remainder being discharged into the pool 39 from which the major portion then flows through conduit 30 to maintain a circulation of cold liquid refrigerant through the evaporator H. The gas lift pump 40, which is in effect a regulating or controlling device, will supply to the evaporator section 44 an amount of liquid refrigerant sufficient for the needs of that part of the evaporator which will be an amount somewhat less than half the amount normally supplied to conduit 30 through the conduit 25.

Thus, in the operation of the device the relatively warm liquid refrigerant formed in the condenser mixes with the cold liquid supplied to the conduit 30 and flows through the cooling unit H which serves to refrigerate a food storage space as will be described hereinafter. This liquid then returns to conduit 33 where it meets an inert gas stream and flows through the evaporator section 43 wherein it is chilled by evaporation of a portion of the liquid into the inert gas. The refrigeration produced in the section 43 also serves to refrigerate ice trays and the like as will be described more fully hereinafter.

The evaporator sections 43 and 44 have been illustrated as lying side by side; however, it is to be understood that these may be positioned one above the other in which event the vessel 32 would be positioned at a point in the conduit connecting the two evaporator sections at different levels.

In the normal operation of refrigerating systems of this type it has been found to be substantially impossible to prevent very small quantities of absorption solution from passing through the analyzer, rectifier and condenser into the evaporator. These small quantities of absorbing solution do not produce any harmful results provided the concentrations thereof in the evaporator can be maintained within certain reasonable limits. The present invention provides a system by which a very large quantity of refrigerant can be circulated through the evaporator and in effect maintained in the evaporator without allowing the absorption solution concentration therein to exceed allowable limits.

The control of the absorption solution concentration is brought about in the following manner. The concentration of absorption solution which will be discharged with the refrigerant discharged from the condenser will normally be only a small fraction of the allowable maximum concentration of absorption solution in evaporating liquid refrigerant. As the apparatus operates the absorption solution concentration within the liquid circulating through the cooling unit H will build up, with the arrangement illustrated, until it reaches a value approximately twice the absorption solution concentration in the liquid refrigerant supplied through conduit 25. The concentration of absorption solution cannot exceed this value as the amount of liquid flowing through the gas lift pump 40 is approximately one-half the amount of liquid flowing into the evaporating system through the conduit 25 but the absorption solution concentration of the liquid flowing through the gas lift pump 40 is approximately twice the absorption solution concentration of the liquid flowing through conduit 25. Consequently, the absolute amount of absorption solution which is being withdrawn from the pool 39 per unit of time is equal to the absolute amount of absorption solution which is being supplied through the conduit 25 per unit of time. All non-volatile material supplied to the evaporator section 44 ultimately returns directly to the solution circuit. In consequence of this arrangement the amount of solution leaving the solution circuit through the conduit 11 per unit of time is exactly balanced by the amount returning to the solution circuit per unit of time through the rich inert gas return line. Therefore, the absorption solution concentration in the cooling unit H, and hence in the evaporator conduit E, is never permitted to build up to limits which will interfere with proper production of refrigeration.

In the refrigerating system just described the freshly produced liquid refrigerant is first mixed with a large amount of very cold liquid refrigerant which serves to chill the freshly produced liquid with some consequent warming of the chilled liquid and traverses an entire cooling unit before being contacted by the inert gas in the evaporative cooling unit. In the evaporative cooling unit not only is a direct refrigerating load carried but an indirect refrigerating load is carried in that a very large quantity of liquid is cooled by the evaporation of a portion of the total quantity of liquid into the inert gas.

Stated somewhat differently, in the present arrangement a single primary cooling unit serves to carry a direct refrigerating load and within itself to refrigerate a cooling medium which then circulates through a remote path to sustain a remote refrigerating load and in which the circulation of the liquid through the remote path is effected by the inert gas circulating through the primary cooling unit.

Figure 3:
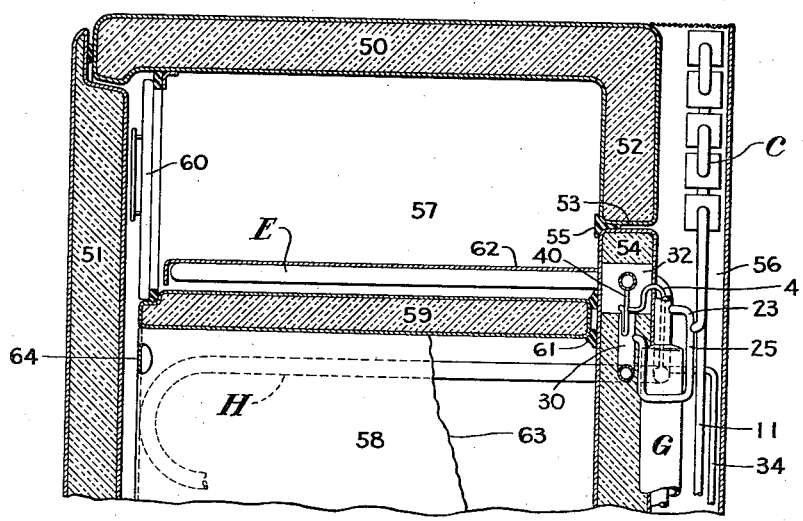
Figure 3 illustrates the manner in which the refrigerating apparatus of Figure 1 is associated with a cabinet.

Referring now to Figure 3 there is illustrated an arrangement of the apparatus in conjunction with a cabinet structure. An insulated cabinet structure 50 is provided which includes an insulated front closure element 51 and a rear wall 52 provided with an opening 53 which is designed to be closed by an insulated panel 54 and a suitable gasket 55. The cabinet rearwardly of the insulated rear wall 52 thereof is provided with a vertically extending cooling air flue 56 which houses the condenser C and the various connecting conduits for the apparatus.

The cabinet is divided into an upper low temperature freezing chamber 57 and a lower higher temperature food storage compartment 58 by an insulated partition 59 which is integrally formed with the side walls of the cabinet 50. A small movable closure 60 is provided for the front of the chamber 57 and suitable sealing gaskets 61 are provided to seal the rear end of the panel 59 to the window closure element 54.

The lower portion of the cabinet will include an underlying mechanism receiving chamber in which will be housed the absorber, boiler-analyzer, liquid heat exchanger assemblies and their various connecting conduits, for example in the manner illustrated and described in U. S. Letters Patent No. 2,203,497, dated June 4, 1940.

The closure element 54 will have a vertical extent equal to the combined vertical extent of the cooling units E and H and a lateral extent equal to the lateral extent of the cooling units E and H.

The refrigerating apparatus per se together with the closure panel 54 will be constructed and tested as a unit and after successful test will be assembled with the cabinet in a well known manner by sliding the refrigerating apparatus forwardly into the cabinet from the rear thereof. This will position the evaporator E above the partition 59 and the cooling unit H in the chamber 58 below the partition 59. As illustrated the chamber 32 is encased within the insulated closure element 54 as well as the rear connecting conduits to the cooling units E and H.

The evaporator E is positioned in the lower portion of the chamber 57 and supports a plate 62 on its upper surface which is adapted to underlie and support ice trays and the like. It is within the purview of the invention to provide a plurality of units in the compartment 57 positioned at different levels in the manner discussed above in connection with the sections 43 and 44 of the evaporator.

The cooling unit H which is positioned in the compartment 58 will be arranged with the sections 27 and 28 thereof lying closely adjacent the left and right hand side walls of the compartment, respectively. The units 27 and 28 will extend substantially the full depth and height of the chamber 58 and are preferably provided on their facing sides with sheet metal heat conductive plates 63 which on their inner faces are provided with suitable means to support trays or shelves and are suitably finished. The forward edges of the plate 63 are turned inwardly as indicated at 64 in order to conceal the cooling conduits 27 and 28. In this way the conduits 27 and 28 are provided with a very large heat conducting surface for cooling the air within the space 58 and for maintaining the same at a desired optimum refrigerating temperature level.

It is within the purview of the invention to embed the conduits 27 and 28 within the insulation of the cabinet 50 lying against the inner side wall, to place these conduits within the chamber 58 and to provide the same with fins in the conventional manner, and to arrange the conduits in convolutions different from those illustrated herein, these all being obvious variations of the arrangement illustrated.

Figure 4:
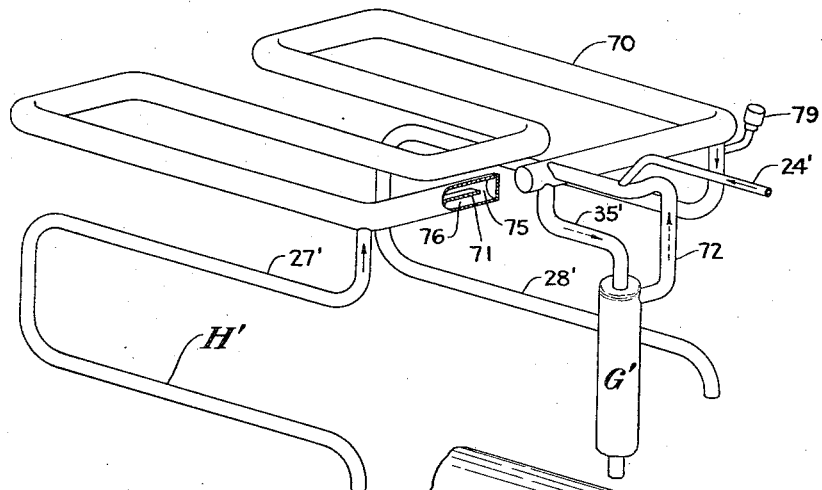
Figure 4 is a diagrammatic representation of a modified form of the invention.
Figure 5:
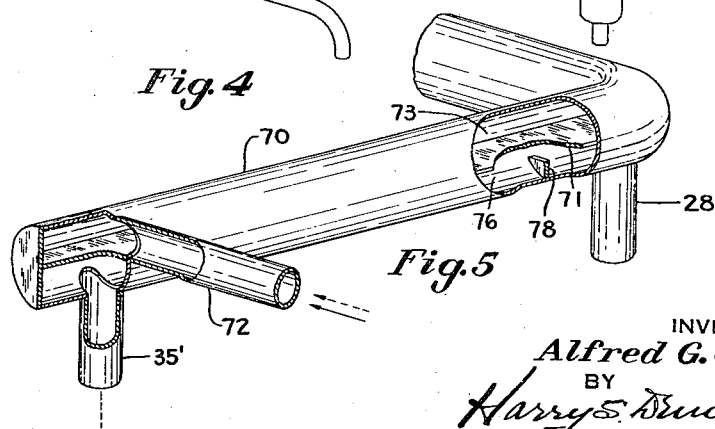
Figure 5 is an enlarged partial sectional detail of the apparatus of Figure 4.

Referring now to Figures 4 and 5, there is illustrated a modified form of the invention. Only the cooling unit portions of the invention have been illustrated in Figures 4 and 5 as the remaining portions of the apparatus will be identical with those disclosed above in connection with Figures 1 and 2. Portions of the apparatus illustrated in Figure 4 which are identical with structures previously illustrated and described in connection with Figures 1 and 2 are consequently given the same reference characters primed.

In this form of the invention the primary evaporator is composed of a sinuous horizontal conduit 70 which is internally divided into upper and lower passageways by a horizontal partition 71. The inert gas is supplied from the gas heat exchanger G' by means of a conduit 72 to the upper gas and liquid flow path 73 which is positioned above the partition 71. The liquid refrigerant from the condenser is supplied to the conduit 72 by the conduit 24'. The liquid refrigerant traverses the upper passageway 73 under the impetus of inert gas which is traveling therethrough with a velocity and pressure sufficient to circulate the refrigerant by a frictional dragging action.

The partition 71 terminates short of one end of the conduit 70 to provide a passageway indicated at 75 between the upper gas passageway 73 and the lower gas passageway 76 which is below the partition 71. The inert gas traverses the pasageway 73, passes around the end of the partition 71 and the communicating passage 75 and then flows back through the lower passage 76 of the conduit 70 underlying the partition 71. In its passage through the passageway 76 the inert gas circulates the liquid which serves to perform a cooling effect in the cooling unit H'.

In this form of the invention the liquid circulating through the cooling unit H' circulates downwardly through the section 28' thereof and upwardly through the section 27' thereof. The liquid discharging from the section 27' into the passageway 76 is circulated therethrough by the sweeping or driving action of the inert gas and then discharges downwardly into the section 28'. A small dam 78 is provided beyond the point of connection between the conduit 28' and 70 in order to prevent liquid from passing into inert gas discharge conduit 35'.

In this form of the invention the cooling unit H' will be charged with absorbing solution having a concentration approximately equal to the normal absorbing solution concentration in the liquid passing through passageway 75. Therefore, the absorbing solution discharged through the conduit 24' from the condenser will ultimately mix with the absorbing solution discharging from the conduit 27'. The absorbing solution which finds its way into the cooling unit H' does not represent a loss of solution from the active solution circuit as an equal amount will overflow the dam 78 and return to the normal solution circuit through the inert gas connection. Due to the concentration of absorbing solution in the passageway 76 this liquid will never freeze and will not evaporate into the inert gas.

The form of the invention provides a further means of circulating an auxiliary fluid by the inert gas, which fluid is refrigerated through partition 71 by the evaporation of the main body of liquid refrigerant into the gas and without disturbing the solution quantities in the various parts of the apparatus. A charging valve, as is indicated at 79, will be provided for charging absorbing solution into the cooling unit H' and its associated passageway 76.

Figure 6:
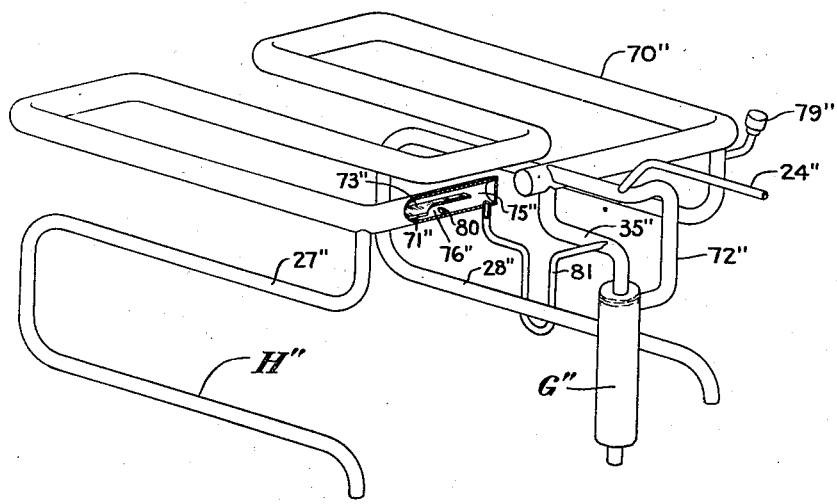
Figure 6 is a diagrammatic representation of a further modified form of the invention.

Referring now to Figure 6 there is illustrated another form of the invention. In this form of the invention the main evaporator conduit 70", the gas heat exchanger G", the cooling unit H" comprising the sinuous conduit sections 27" and 28", the inert gas connections 72" and 35", the liquid refrigerant supply connection 24" and the interior structure of the evaporating conduit 70" are all identical with the correspondingly numbered parts of Figures 4 and 5 and have therefore been given the double primed corresponding reference characters.

This form of the invention differs from the form of the invention illustrated and described in connection with Figures 4 and 5 in that the liquid circulating through the passageway 76" and the cooling unit H" may be a fluid having no affinity for ammonia vapor which will not freeze at the temperature levels prevailing in the evaporator conduit 70", or it may be a water ammonia solution as in Figures 4 and 5. The liquid in passageway 76" is circulated by the inert gas. Fluids such as ethylamines and the like may be used in cooling unit H".

In this form of the invention the absorption solution which discharges into the evaporating unit together with the liquid refrigerant supplied through the conduit 24" is separated from the inert gas in the passageway 75" and is prevented from passing over into the passageway 76" by the dam 80. This unevaporated or non-volatile residue from the passageway 73" is then conveyed to the conduit 35" by a conduit 81 which is arranged to form a U-shaped liquid sealing trap as shown to prevent by-passing of inert gas. This form of the invention operates exactly in the same manner as those previously described.

In the forms of evaporator conduits illustrated at 70 and 70" the conduit comprises in effect two passageways which are formed by constructing a horizontal partition in a single conduit. Other forms of double conduits could be utilized, however, without departing from the invention; for example, that illustrated and described in U. S. Letters Patent No. 2,259,433, dated October 14, 1941.

Figure 7:
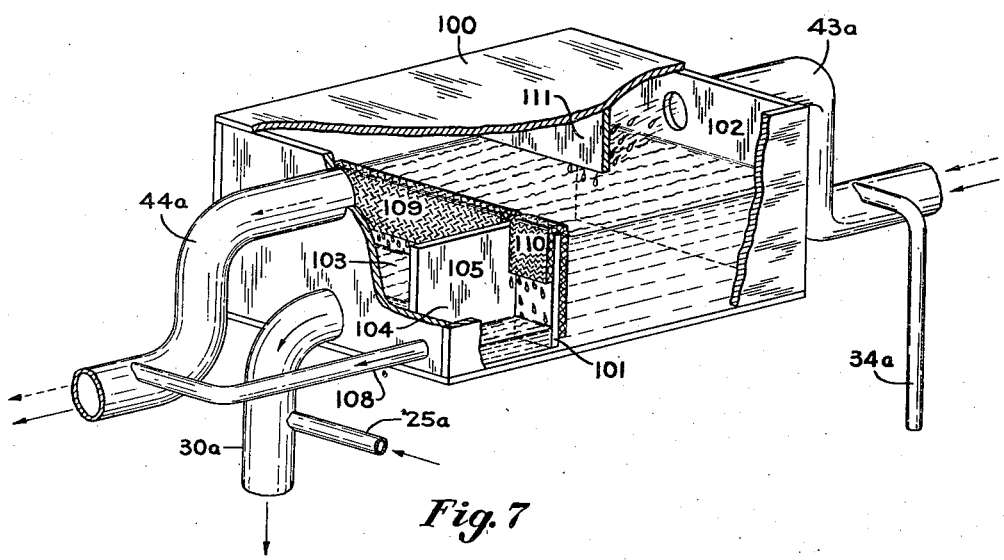
Figure 7 is an enlarged sectional view in detail of a further modification of the invention.

In Figure 7 there is illustrated a modified arrangement adapted to replace the type of structure illustrated in Figure 2.

This form of the invention comprises a separating and dividing chamber 100 which will be inserted between two complementary evaporator sections, such as those illustrated at 43 and 44 in Figure 1. Parts of the apparatus illustrated in Figure 7 which correspond to parts of the apparatus illustrated and described in connection with Figure 1 are given the same reference characters with the added subscript a.

The chamber 100 is provided interiorly thereof with a transverse partition 101 dividing the same into a separation chamber 102 into which the conduit 43a discharges and into a pair of chambers 103 and 104 which are separated by the partition 105. The evaporator conduit 44a opens into the upper or gas containing space above the chamber 103 and the conduit 30a which connects to a cooling unit corresponding to cooling unit H in Figure 1 opens into the lower or liquid containing portion of the chamber 103.

A conduit 108 is connected between the lower or liquid containing portion of the chamber 104 and the evaporator conduit 44a.

A pair of wicks 109 and 110 extend over the partition 101 into the chambers 103 and 104, respectively. The wick 109 is much larger than the wick 110, consequently the liquid which is separated from the inert gas in the chamber 102 by the baffle 111 is divided between the chambers 103 and 104 proportionately to the relative sizes of the wicks 109 and 110. The wick 110 is preferably designed to discharge a quantity of liquid per unit of time equal to the quantity discharged through conduit 25a. The wick 109 will, for example, discharge ten to twenty times this amount of liquid for recirculation through the cooling unit.

This form of the invention otherwise operates identically with the form of the invention illustrated in Figure 1; that is, the absolute quantity of absorbing solution and the like which are supplied to the conduit 44a per unit of time is equal to the absolute quantity of absorption solution and the like supplied to the conduit 25a per unit of time, wherefore the concentration of absorbing solution which is allowed to build up within the liquid circulating through the cooling unit Ha will not exceed twice the concentration in the freshly supplied liquid. This form of the invention is particularly adaptable to an arrangement in which the evaporator coil 43a is positioned at a level above the evaporator coil 44; that is, these two are parallel and directly above each other in parallel horizontal planes.

In all forms of the invention illustrated herein the lean inert gas discharged from the absorber flows through the evaporating zone in a manner to circulate liquid refrigerant therethrough. It is, however, within the purview of the invention so to design the evaporator that the inert gas will flow in counterflow relationship with the evaporating liquid and to circulate the liquid flowing through the cooling coil either before or after its contact with the evaporating refrigerant. In all forms of the invention herein illustrated the liquid flowing through the cooling coil is circulated by a sweeping or dragging frictional propulsion exerted by the inert gas. It is, however, within the field of the invention to circulate the liquid in the cooling coil by a gas lift action in which the gas is taken from the normal inert gas circuit of the refrigerating apparatus. Other variations and modifications of the invention will be obvious to those skilled in the art.

I claim:

1. That improvement in the art of refrigeration which includes the steps of applying heat to a solution of refrigerant in an absorbent to expel refrigerant in vapor phase, liquefying the expelled refrigerant vapor, evaporating refrigerant liquid into the insert gas to produce a primary refrigerating effect and utilizing the inert gas to circulate liquid through a secondary refrigerating zone and in heat transfer relationship with said evaporating refrigerant liquid.

2. Absorption refrigerating apparatus comprising a generator and an absorber connected for circulation of absorption solution therebetween, an inert gas circuit including an evaporator and said absorber for circulation of inert gas therebetween, a condenser connected to receive refrigerant vapor from said boiler and to discharge refrigerant liquid for evaporation into the inert gas in said evaporator, and means providing a path of flow of a cooling medium having a part in heat transfer relationship with refrigerant liquid evaporating in said evaporator, said inert gas circuit including a part in common with said path of flow of cooling medium through which said inert gas circulates said cooling medium.

3. In a refrigerator; a cabinet structure comprising a mechanism compartment, an insulated freezing chamber and an insulated food preserving chamber; an absorption refrigerating apparatus associated with said cabinet structure comprising an evaporator in said freezing chamber, means providing a path of flow of a cooling medium in heat transfer relationship with said food preserving chamber and providing for refrigeration of said cooling medium by refrigerant liquid evaporating in said evaporator; a generator and an absorber in said mechanism compartment, a condenser in said mechanism compartment arranged to receive refrigerant vapor from said generator and to supply refrigerant liquid to said evaporator; means forming an inert gas circuit including said absorber, said evaporator and a part of said means forming a path of flow of cooling medium; and means in said inert gas circuit for imparting pressure to the inert gas to produce flow of the inert gas and flow of said cooling medium.

4. In a refrigerator; a cabinet structure comprising a mechanism compartment, an insulated freezing chamber and an insulated food preserving chamber; an absorption refrigerating apparatus associated with said cabinet structure comprising an evaporator in said freezing chamber, conduit means providing a path of flow of a cooling medium having a part arranged to lie adjacent a vertical wall of said food preserving chamber to refrigerate said food preserving chamber and a part arranged to bring the cooling medium into heat transfer relationship with liquid refrigerant evaporating in said evaporator, a generator and an absorber in said mechanism compartment, a condenser in said mechanism compartment arranged to receive refrigerant vapor from said generator and to supply refrigerant liquid to said evaporator; means forming an inert gas circuit including said absorber, said evaporator and a part of said means forming a path of flow of cooling medium; and means in said inert gas circuit for imparting pressure to the inert gas to produce flow of the inert gas and flow of said cooling medium.

5. In a refrigerator a cabinet structure comprising an insulated body forming a refrigerating compartment, an insulated partition in said compartment separating the compartment into freezing and storage chambers; a refrigerating system of the type utilizing an inert gas associated with said cabinet structure including an evaporating unit in one of said chambers, a fluid conducting conduit in the other of said compartments, means for conducting a cooling medium from said conduit into cooling relationship with refrigerant evaporating in said evaporating unit, and means for circulating inert gas through said evaporator and for circulating the cooling medium through said conduit and said conducting means.

6. Absorption refrigerating apparatus comprising an absorber and a generator connected for circulation of absorption solution therebetween, an evaporator and an absorber connected for circulation of inert gas therebetween, a condenser connected to receive refrigerant vapor from said generator, conduit means forming a path of flow of cooling medium arranged to bring said cooling medium into contact with the inert gas in a portion of its path of flow and to pass said cooling medium into heat transfer relationship with refrigerant liquid evaporating in said evaporator, and means constructed and arranged to withdraw an amount of material which is non-volatile in the evaporator per unit of time from said evaporator equal to the amount of such material supplied to said evaporator per unit of time.

7. In an absorption refrigerating apparatus of the type utilizing a refrigerant, an absorbent for the refrigerant and an inert gas, an evaporator, an absorber, a generator, a condenser, means providing for circulation of absorption solution between the generator and the absorber, means providing for circulation of inert gas between the absorber and the evaporator, said condenser being connected to receive refrigerant vapor from said generator, a container for refrigerant liquid connected with said evapoator for flow of refrigerant liquid in a circuit including said container and at least a portion of said evaporator, means for supplying refrigerant liquid from said condenser to said evaporator, and means for removing material which is non-volatile in said evaporator from said evaporator in quantities sufficient to prevent the concentration of non-volatile material in the liquid in said container from exceeding a predetermined value.

8. In an absorption refrigerating apparatus of the type utilizing a refrigerant, an absorbent for the refrigerant and an inert gas, a cooling unit structure including an evaporator part and a cooled medium circulating part, an absorber, a generator, a condenser, means providing for circulation of absorption solution between said generator and said absorber, means providing for circulation of inert gas between said absorber and said cooling unit structure, means for conducting refrigerant vapor from said generator to said condenser, means for conducting refrigerant liquid from said condenser to said cooling unit structure, said cooling unit structure being constructed and arranged to contain a permanent body of cooling medium therein flowing in a closed path of flow including said circulating part under the impetus of inert gas flowing through said cooling unit structure and to discharge material which is non-volatile in said evaporator part therefrom in an amount substantially equal to the amount of such material supplied thereto.

9. In an absorption refrigerating apparatus of the type utilizing a refrigerant, an absorbent for the refrigerant and an inert gas, an evaporator, an absorber, a generator, a condenser, means providing for circulation of absorption solution between the generator and the absorber, means providing for circulation of inert gas between the absorber and the evaporator, said condenser being connected to receive refrigerant vapor from said generator and to discharge refrigerant liquid into said evaporator, a cooling coil containing cooling fluid having a portion in heat exchange relationship with said evaporator and arranged for circulation of said inert gas through said portion to circulate said cooling fluid.

10. In an absorption refrigerating apparatus of the type utilizing a refrigerant, an absorbent for the refrigerant and an inert gas, an evaporator, an absorber, a generator, a condenser, means providing for circulation of absorption solution between the generator and the absorber, means providing for circulation of inert gas between the absorber and the evaporator, said condenser being connected to receive refrigerant vapor from said generator and to discharge refrigerant liquid into said evaporator, a cooling coil containing cooling fluid having a portion in heat exchange relationship with said evaporator and arranged for circulation of said inert gas through said portion to circulate said cooling fluid, and means for removing liquid from said inert gas prior to contact between said inert gas and said cooling fluid.

11. In an absorption refrigerating apparatus of the type utilizing a refrigerant, an absorbent for the refrigerant and an inert gas, an evaporator, an absorber, a generator, a condenser, means providing for circulation of absorption solution between the generator and the absorber, means providing for circulation of inert gas between the absorber and the evaporator, said condenser being connected to receive refrigerant vapor from said generator and to discharge refrigerant liquid into said evaporator, a cooling coil containing cooling fluid having a portion in heat exchange relationship with said evaporator and arranged for circulation of said inert gas through said portion to circulate said cooling fluid, said cooling fluid comprising a solution of said refrigerant in said absorbent, and means for conveying fluid over and above a predetermined quantity from said coil to a portion of the apparatus containing absorption solution.

12. Absorption refrigerating apparatus comprising an evaporator, an absorber, a condenser, a generator, means providing for circulation of absorption solution between said absorber and said generator, means for conducting refrigerant vapor from said generator to said condenser and for conducting refrigerant liquid from said condenser to said evaporator, a cooling coil connected with said evaporator to form a path of flow of refrigerant liquid including said coil and a portion of said evaporator, means for circulating inert gas through said portion of said evaporator with sufficient velocity and pressure to propel refrigerant liquid therethrough and through said coil, and means for conveying refrigerant liquid from said path of flow of refrigerant liquid to the remaining portion of said evaporator.

13. In an absorption refrigerating apparatus of the three-fluid type, a circuit for inert gas including an evaporator, means forming a path of flow of refrigerant liquid including a portion of said evaporator, a source of supply of refrigerant liquid arranged to supply refrigerant liquid to said path of flow, means in said inert gas circuit for propelling inert gas through said evaporator with sufficient velocity and pressure to circulate refrigerant liquid in said path of flow, and means for conducting refrigerant liquid from said path of flow to the portion of said evaporator not included in said path of flow.

14. In an absorption refrigerating apparatus of the three-fluid type, a circuit for inert gas including an evaporator, means forming a path of flow of refrigerant liquid including a portion of said evaporator, a source of supply of refrigerant liquid arranged to supply refrigerant liquid to said path of flow, means in said inert gas circuit for propelling inert gas through said evaporator with sufficient velocity and pressure to circulate refrigerant liquid in said path of flow, a gas lift pump arranged to withdraw refrigerant liquid from said path of flow and to discharge such liquid into the portion of said evaporator not included in said path of flow, and means for supplying pumping gas to said gas lift pump.

15. In a refrigerator; a cabinet structure having an insulated storage chamber, an insulated freezing chamber and a mechanism chamber; an absorption refrigerating apparatus associated with said cabinet structure comprising an evaporative cooler in said freezing chamber, an indirect cooler containing a cooling medium having a cooling part in said storage chamber and associated with said evaporative cooler for chilling said cooling medium, means for supplying a volatile refrigerant to said evaporative cooler, means for circulating an inert gas under pressure through said evaporative cooler and for utilization of the inert gas under pressure to promote circulation of said cooling medium.

16. In a refrigerating apparatus of the absorption type, a cooling unit structure arranged to provide a path of flow of an evaporating refrigerant and a path of flow for a cooling medium in part of which the cooling medium is cooled by the evaporating refrigerant, means for supplying an evaporative refrigerant liquid to said cooling unit structure, and means for propelling an inert gas through portions of said cooling unit structure in contact with said evaporative refrigerant liquid and said cooling medium.

17. In a refrigerator, an absorber, a generator, a condenser, means providing for circulation of absorption solution between said absorber and said generator, means for conducting refrigerant vapor from said generator to said condenser, a first cooling unit connected to receive refrigerant liquid from said condenser, a second cooling unit containing a cooling medium, said cooling units being so constructed and arranged that a path of flow of cooling medium is provided in which cooling medium flows through said second cooling unit and in heat exchange relation with refrigerant evaporating in said first cooling unit and structure providing a path of flow of inert gas in which the inert gas traverses said absorber, contacts said evaporative refrigerant liquid and promotes the flow of cooling medium through said second cooling unit.

18. In a refrigerating apparatus of the absorption type utilizing a refrigerant, an absorbent for the refrigerant and a pressure equalizing medium which is inert with respect to the refrigerant and absorbent, a refrigerating unit structure including an evaporator and a cooling unit providing a closed circulatory path of flow of liquid in which the liquid is cooled by liquid evaporated in the presence of inert gas in said evaporator and absorbs heat from material to be cooled in other portions of said path of flow and returns to said portion of said path of flow in which the liquid is cooled, means for producing refrigerant liquid and for supplying the refrigerant liquid to said refrigerating unit structure, means for propelling pressure equalizing medium through said refrigerating unit in contact with liquid evaporating to produce a refrigerating effect and in contact with said liquid being cooled with sufficient velocity and pressure to circulate liquid through said cooling unit.

19. In an absorption refrigerating apparatus, a condenser, an absorber, a generator and a refrigerating unit including an evaporator and structure connected in circuit providing a closed circulatory path of flow for a liquid, said path of flow of liquid being in part in heat transfer relationship with refrigerant evaporating in said evaporator and in part in heat exchange relation with an object of refrigeration spaced from said evaporator, and means for imparting a propelling force to an inert gas for circulating the inert gas through said evaporator and for circulating said liquid through said path of flow.

20. A refrigerating unit structure including an evaporating portion and a portion forming an elongated path of flow of cooled liquid to produce a secondary refrigerating effect solely by cold liquid flowing therethrough, means for propelling an inert gas through said refrigerating unit structure in contact with refrigerant liquid to be evaporated in said evaporator portion and in contact with liquid to be circulated through said elongated path of flow with sufficient velocity and pressure to circulate liquid through said elongated path of flow, said refrigerating unit structure being constructed and arranged to refrigerate said liquid which flows through said elongated path of flow by evaporation of refrigerant liquid into the inert gas in said evaporating portion.

21. In a refrigerator, a cabinet structure providing an insulated refrigerating chamber, a freezing chamber, a cooling unit having a liquid conveying part in heat exchange with said insulated refrigerating chamber to refrigerate said chamber by the heat absorptive capacity of cooled liquid flowing therein and a part in heat exchange relation with said freezing chamber wherein said freezing chamber and liquid flowing to said liquid conveying part are cooled by evaporation of liquid into an inert gas, and means for flowing an inert gas through said cooling unit in contact with evaporating liquid and with liquid being cooled with sufficient force to impart a propulsive force to said liquid being cooled.

22. In a refrigerator, a cabinet structure having distinct insulated freezing and food preserving chambers therein, a cooling unit having part in heat exchange with said freezing chamber and a liquid filled part in said food preserving chamber, said cooling unit being constructed and arranged to provide a circulatory path of flow of liquid including said liquid filled part and a part wherein liquid flowing in said circulatory path to said liquid filled part is cooled by liquid evaporating into an inert gas in heat exchange with said freezing chamber to refrigerate the same, and means for circulating inert gas through said cooling unit in contact with evaporating liquid and with liquid being cooled with sufficient force to circulate said liquid being cooled through said liquid filled part.

23. In a refrigerating apparatus, a cooling unit having means forming a closed circulatory path of flow of cooled liquid to produce a first refrigerating effect by the heat absorptive capacity of such cooled liquid, means forming a second path of flow of liquid arranged to cool liquid for said first path of flow of liquid and to produce a primary refrigerating effect by evaporation of liquid into an inert gas, means for placing an inert gas under pressure and for supplying inert gas under pressure to said cooling unit, said cooling unit being so constructed and arranged that the inert gas under pressure flowing therein contacts liquid evaporating in said second path of flow and applies a propulsive force to cooled liquid to circulate such cooled liquid through said first path of flow.

24. In a refrigerating apparatus of the absorption type utilizing a refrigerant, an absorbent for the refrigerant and a pressure equalizing medium which is inert with respect to the refrigerant and absorbent, a chilling structure including a cooling unit containing a liquid and an evaporator, refrigerant liquid supply means for producing refrigerant liquid and for supplying such liquid to said chilling structure, and means for circulating a pressure equalizing medium through a portion of said chilling structure with sufficient velocity and pressure to circulate refrigerant through said evaporator and to circulate said liquid through said cooling unit, said chilling structure being so constructed and arranged that said evaporator refrigerates liquid which is supplied to said cooling unit.

ALFRED G. GROSS.